Patented Jan. 10, 1950

2,494,095

UNITED STATES PATENT OFFICE 2,494,095

ACID-CURING THERMOSETTING RESIN COMPOSITIONS, PROCESSES OF CURING SAME, AND PRODUCTS THEREOF

Washington Hull, Noroton Heights, Conn., assignor to American Cyanamid Company, New York, N. Y., a corporation of Maine No Drawing. Application April 4, 1945, Serial No. 586,630

8 Claims. (Cl. 260—30.8)

This invention relates to processes of curing resinous compositions containing an acid-curing, thermosetting resin and to stable compositions containing curing catalysts. More specifically, the invention relates to urea-formaldehyde and melamine-formaldehyde molding compositions containing latent curing catalysts and to processes of curing such compositions.

Many different substances have been proposed for use as latent curing catalysts for acid-curing, thermosetting resins. However, most of the catalysts which have been used previously with acid-curing, thermosetting resins cause such resins to lose plasticity at relatively low temperatures. If compositions containing such catalysts together with an uncured acid-curing, thermosetting resin be stored, the resin may become partially or even wholly cured, even at normal temperatures. This results, in the case of molding powders, in a loss of proper flow characteristics and, therefore, in a loss of utility of the product for most purposes. To be a satisfactory latent curing catalyst a substance must remain dormant or inactive at ordinary room temperatures, and at elevated temperatures, must catalyze the curing of the resin at a rapid rate.

An object of the present invention is to provide a process for curing acid-curing thermosetting resins.

Another object of the present invention is to provide catalysts for acid-curing, thermosetting resins which will cure such resins rapidly only at relatively high temperatures.

Still another object of this invention is to provide compositions containing an acid-curing, thermosetting resin and a curing catalyst, which compositions are substantially stable at room temperatures.

A further object of the present invention is to provide molding compositions containing an acid-curing, thermosetting resin such as a urea-formaldehyde resin, melamine-formaldehyde resin, etc., a filler and a curing catalyst, which compositions will retain good flow characteristics upon molding, even after long periods of storage at ordinary or slightly elevated temperatures.

Another object of this invention is to provide molded articles having improved water resistance and cracking resistance.

These and other objects are attained by incorporating 3,6 endomethylene $\Delta^4$-tetrahydro-o-phthalic anhydride, $\Delta^4$-tetrahydrophthalic anhydride, 3,6 endomethylene hexahydrophthalic anhydride or hexahydrophthalic anhydride into a composition including an acid-curing, thermosetting resin and thereafter heating the composition to effect the cure of the resin. Hexamethylenetetramine and a sulfonamide plasticizer are preferably incorporated into molding compositions containing endomethylene tetrahydrophthalic anhydride.

The following examples, in which the proportions are in parts by weight, are given by way of illustration and not in limitation.

EXAMPLE 1

*Preparation of catalyst composition "A"*

About 70 parts of an eutectic mixture of ortho- and para- toluene sulfonamide are heated about 125° C. in a suitable vessel until the mixture is molten and then 30 parts of endomethylene tetrahydrophthalic anhydride are added slowly with agitation until a homogeneous melt is obtained. The melt is poured into trays and cooled (preferably under refrigeration) for about one-half hour, or more, until a hard solid is obtained. When sufficiently hard, the cooled, solid material is ground into fine particles and is then suitable for use.

*Preparation of molding composition*

| | Parts |
|---|---|
| Urea-formaldehyde resin composition | 99 |
| Catalyst composition "A" | 0.35 |
| Hexamethylenetetramine | 0.175 |
| Zinc stearate | 0.5 |

The urea-formaldehyde resin composition is prepared by reacting 57 parts of urea with about 100 parts of formalin (37% formaldehyde) containing about 0.22 part of triethanolamine in the usual manner and, thereafter, impregnating alpha cellulose pulp therewith to form a composition containing 65% of resin solids and 35% of alpha cellulose, after which the composition is dried.

The materials tabulated above are ground thoroughly in a suitable manner such as in a Banbury mill or in a ball mill. The resulting composition is stable upon storage at ordinary temperatures for long periods of time, but upon molding at pressures of about 2000–5000 p. s. i. at about 135–165° C. for from about ½–3 minutes, for ordinary small pieces, excellent moldings are obtained. The molded articles have superior water resistance and do not crack readily upon exposure to temperature and humidity changes.

EXAMPLE 2

Example 1 is repeated except that a melamine-formaldehyde resin molding composition is substituted for the urea-formaldehyde resin molding composition. Such melamine-formaldehyde resin molding compositions are described in Patent No. 2,310,004. The ratio of formaldehyde to melamine is preferably between about 2:1 and 3:1. Moldings having excellent water resistance are obtained from molding compositions produced in accordance with this example. The molding compositions have good stability and excellent flow characteristics.

In order to show the outstanding stability of molding compositions produced in accordance with the present invention, flow-mold tests were conducted after storing the composition produced according to Example 1 at 120° F. and similar tests were conducted on compositions like those of Example 1, except that phthalic anhydride is substituted for the endomethylene tetrahydrophthalic anhydride. The flow-mold test is carried out with a disk mold which comprises a stainless steel cylindrical vessel and a stainless steel plate whose periphery is machined to fit the circular opening of the cylindrical vessel. The cylindrical vessel is 11¼" in outside diameter, 1" high, 10" in inside diameter, and the inside depth is ½", while the circular plate is 10" in diameter and ½" in thickness. The inner bottom surface of the cylindrical vessel contains shallow concentric grooves whose radii are 1.5", 2", 2.5", 3", 3.5", 4" and 4.5". The flow-mold test apparatus is preheated to 144° C. and then 60 grams of a molding composition to be tested are heaped in the center of the bottom surface of the cylinder and the plate is inserted to close the opening of the vessel. The mold is then placed in a press, maintained at a temperature of 144° C. and a pressure of 700 p. s. i. is applied to the disk mold. When the pressure guage remains constant without adjustments of pressure, the mold is withdrawn and the cured composition is removed. The thickness of the molded composition in each of those portions of the four quadrants which are bounded by the circumferences of the second and third circular ridges is determined by the use of a micrometer caliper. The average of the four readings is recorded for comparison.

The following table shows the results obtained after storage of a composition produced in accordance with Example 1, and a similar composition produced in accordance with Example 1 but substituting phthalic anhydride for endomethylene tetrahydrophthalic anhydride:

| Weeks Aged at 120° F. | Endomethylene Tetrahydrophthalic Anhydride | Phthalic Anhydride |
|---|---|---|
| | Thickness of molded compositions | |
| | Inch | Inch |
| 1 | 0.035 | 0.037 |
| 2 | 0.040 | 0.043 |
| 3 | 0.041 | 0.043 |
| 4 | 0.041 | 0.055 |
| | 0.051 | ¹ N. G. |

¹ Composition cured before reaching the testing zone of the mold.

From the foregoing table it is apparent that compositions produced in accordance with this invention have excellent stability upon storage for relatively long periods of time, even at elevated temperatures. It is to be noted that the composition containing phthalic anhydride as a curing catalyst has lost so much plasticity that, after only three weeks of storage, it would not be suitable for anything but the molding of very small pieces, such as buttons. On the other hand, molding compositions of general utility have a flow mold thickness of about 0.4" or less and, accordingly, even after three weeks at 120° F. compositions produced in accordance with this invention are suitable for general utility in molding various sized and shaped articles and after 4 weeks my compositions are still usable in certain fields. It is to be noted that before storage, compositions produced in accordance with the present invention have somewhat better plasticity than similar compositions containing phthalic anhydride as a curing catalyst. This is also emphasized by the Peakes flow test. For the composition of Example 1, 520 p. s. i. are required for 1" of flow at 150° C. whereas, when phthalic anhydride is substituted for the endomethylene tetrahydrophthalic anhydride 620 p. s. i. are required for 1" of flow at 150° C.

It is also found that compositions containing phthalic anhydride have a considerably lower pH at room temperatures than corresponding compositions containing endomethylene tetrahydrophthalic anhydride.

Endomethylene tetrahydrophthalic anhydride may be used as a curing catalyst for urea-formaldehyde resins, thiourea-formaldehyde resins, amino-triazine-formaldehyde resins such as those described in Patent No. 2,310,004, phenol-formaldehyde resins or mixtures thereof. Usually only a small proportion of catalyst is necessary to produce rapid cures in molding compositions and from about 0.05–2% of the catalyst, based upon the resin content of the composition, is preferred, although even considerably greater quantities of catalyst may be used without causing substantial pre-curing during storage or the like. In some applications up to about 5% of the endomethylene tetrahydrophthalic anhydride may be advantageously used.

It is preferable that a small proportion of hexamethylenetetramine be included in the composition along with the endomethylene tetrahydrophthalic anhydride because it increases the stability of the compositions. For this purpose about 0.05–0.5%, based upon the resin content of the compositions, is suitable.

Plasticizing agents other than the toluene sulfonamides mentioned in Example 1 may be employed, for example the N-ethanol toluene sulfonamides, the N-methylol toluene sulfonamides, N-methylol phthalimide, N-methylol succinamide, the N-ethanolamides and the N-ethanolimides, etc. Other types of plasticizing agents may also be used, including alkyd resins, polyhydric alcohols, esters, etc.

A mold lubricant is preferably included in the molding compositions, for example zinc stearate, calcium stearate, mixtures thereof, natural and synthetic waxes, etc. By fusing a plasticizer such as one or more of the toluene sulfonamides with the endomethylene tetrahydrophthalic anyhdride and finely grinding the resulting material after solidification, somewhat better distribution and results are obtained after incorporating the mixture into a molding composition.

The molding compositions produced in accordance with this invention may include various fillers or mixtures of fillers, such as wood flour, cotton flock, glass fibers, silica flour, fabrics of cotton, glass, or other fibers, etc.

Compositions containing endomethylene tetrahydrophthalic anhydride and an acid curing thermosetting resin are cured by heating them to temperatures of about 130–160° C., preferably under pressure.

While the use of endomethylene tetrahydrophthalic anyhdride has been described primarily in conjunction with the curing of molding compositions, it may be used as a curing catalyst in various applications to acid-curing, thermosetting resins. Among these it is especially suitable for use in adhesives which are, like molding compositions, often distributed to the user in the form of a substantially dry, free-flowing powder or granular material. Endomethylene tetrahydrophthalic anhydride may also be used as a curing catalyst for compositions used in impregnating or coating fibrous materials, in casting compositions, in laminating syrups, and also in the production of protective coatings on various surfaces such as wood, metal, etc. Furthermore, this catalyst may be used in the curing of alkylated urea-formaldehyde resins or alkylated melamine-formaldehyde resins and other similar alkylated acid-curing thermosetting resins. Among these, some examples are the urea-formaldehyde resins alkylated with methanol, ethanol, propanol, butanol, 2 ethyl hexanol, etc. Numerous examples of other alkylated resins of the melamine-formaldehyde types are disclosed in Patent No. 2,197,357. Compositions containing alkylated urea-formaldehyde resins, or the alkylated melamine-formaldehyde resins are especially suitable in the production of coatings, and in the manufacture of paints, enamels and the like.

While the invention has been described particularly in conjunction with the use of endomethylene tetrahydrophthalic anhydride, which is preferred, part or all of it may be replaced with $\Delta^4$-tetrahydrophthalic anhydride, 3,6 endomethylene hexahydrophthalic anhydride or hexahydrophthalic anhydride. Furthermore, a mixture of all of the aforementioned phthalic anhydride derivatives may be used, e. g. about 0.05% of each of the four substances based on the resin content.

Obviously, many modifications and variations in the compositions and processes described herein may be made without departing from the spirit and scope of the invention as defined in the appended claims.

I claim:

1. A molding composition comprising a polymerizable urea-formaldehyde resin, an inert filler, 0.1–0.5% of hexamethylene tetramine, 0.05–2% of endomethylene tetrahydrophthalic anhydride, the percentages being based upon the weight of said resin.

2. A process of curing a polymerizable, acid-curing, thermosetting resin selected from the group consisting of melamine-formaldehyde and urea-formaldehyde resins which comprises heating said resin to a temperature of at least 130° C. while intimately mixed with 0.05–5% of endomethylene tetrahydrophthalic anhydride based on the resin content.

3. A composition comprising a polymerizable, acid-curing, thermosetting resin selected from the group consisting of melamine-formaldehyde and urea-formaldehyde resins and 0.05–5% endomethylene tetrahydrophthalic anhydride based on the resin content.

4. A composition comprising a polymerizable, acid-curing, thermosetting resin selected from the group consisting of melamine-formaldehyde and urea-formaldehyde resins and 0.05–0.5% of hexamethylene tetramine and, as a curing catalyst, 0.05–5% of endomethylene tetrahydrophthalic anhydride in which said percentages are based on the resin content.

5. A composition comprising a polymerizable, acid-curing, thermosetting resin selected from the group consisting of melamine-formaldehyde and urea-formaldehyde resins, a toluene sulfonamide and, as a curing catalyst, 0.05–5% endomethylene tetrahydrophthalic anhydride based on the resin content.

6. A molding composition comprising a polymerizable, acid-curing, thermosetting resin selected from the group consisting of melamine-formaldehyde and urea-formaldehyde resins, an inert filler, a eutectic mixture of ortho- and para-toluene sulfonamide, 0.05–0.5% hexamethylene tetramine and 0.05–5% endomethylene tetrahydrophthalic anhydride based on the resin content.

7. A substantially dry, finely divided composition comprising a polymerizable urea-formaldehyde resin, 0.05–0.5% of hexamethylene tetramine, and 0.05–5% of endomethylene tetrahydrophthalic anhydride in which said percentages are based on the resin content.

8. A heat and pressure consolidated article comprising the composition of claim 3 in cured form.

WASHINGTON HULL.

REFERENCES CITED

The following references are of record in the file of this patent:

UNITED STATES PATENTS

| Number | Name | Date |
|---|---|---|
| 2,200,164 | Durant | May 7, 1940 |
| 2,227,693 | Balz | Jan. 7, 1941 |

FOREIGN PATENTS

| Number | Country | Date |
|---|---|---|
| 351,093 | Great Britain | June 25, 1931 |